(12) United States Patent
Mabuchi et al.

(10) Patent No.: US 6,643,734 B2
(45) Date of Patent: Nov. 4, 2003

(54) CONTROL DEVICE AND CONTROL METHOD FOR A DISK ARRAY

(75) Inventors: Atsushi Mabuchi, Tokyo (JP); Yoshihide Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/265,381

(22) Filed: Mar. 10, 1999

(65) Prior Publication Data

US 2002/0069377 A1 Jun. 6, 2002

(30) Foreign Application Priority Data

Mar. 10, 1998 (JP) ............................................ 10-076679

(51) Int. Cl.$^7$ ................................................ G06F 11/30
(52) U.S. Cl. ........................................ 711/114; 714/55
(58) Field of Search ............................. 711/4, 112–114, 711/167; 714/25, 42, 44, 706, 55, 769–770, 814–815

(56) References Cited

U.S. PATENT DOCUMENTS 5,530,872 A * 6/1996 Smeltzer et al. ............ 710/260
5,758,057 A * 5/1998 Baba et al. ..................... 714/7

FOREIGN PATENT DOCUMENTS

| JP | H9-69027 | 3/1995 |
| JP | 7-200191 | 8/1995 |
| JP | H7-281966 | 10/1995 |
| JP | 8-123628 | 5/1996 |
| JP | 8-171463 | 7/1996 |

OTHER PUBLICATIONS

William Stallings, "ComputerOrganization and Architecture", Prentice–Hall International, Inc., Fourth Edition, 1996, pp. 161–169.

* cited by examiner

Primary Examiner—Matthew Kim
Assistant Examiner—Denise Tran
(74) Attorney, Agent, or Firm—Sughrue Mion, PLLC

(57) ABSTRACT

A control device for a disk array of the present invention includes a first element which accesses a plurality of disks of the disk array and a timer which counts to a first timeout value when all of the disks are normal and a second timeout value when one of the disks is defective, unless the first element receives response from the disks. The control device for a disk array also has a second element which determines that an access fails if the timer reaches one of the first or second timeout values. A control method for a disk array of the present invention includes accessing a plurality of disks of the disk array, counting to a first timeout value when all of the disks are normal and a second timeout value when one of the disks is defective, unless there is a response during the accessing step, and determining that an access fails if one of the first or second timeout value is reached during the counting step.

17 Claims, 6 Drawing Sheets

CONTROL DEVICE AND CONTROL METHOD FOR A DISK ARRAY

BACKGROUND OF THE INVENTION

The present invention relates to a control device and control method for a disk array used in a computer system, more particularly, to a control device and control method for a disk array which changes the operation monitoring time for data write or read of a disk array based on the state of the disk array.

A conventional disk array known as a Redundant Array of Independent (or Inexpensive) Disks (RAID) system uses a plurality of inexpensive disk devices which operate independently from each other and also which are connected in parallel. The RAID system stores data dispersed to the small capacity disk devices, and accesses the dispersed stored data in parallel and at the same time. Therefore, the RAID system can process an Input/Output (I/O) request at high speed and efficiently.

There are six classifications from level 0 to 5 in the RAID. The classifications are described in detail, for example, in the publication William Stallings, "Computer Organization and Architecture", Prentice-Hall International Inc., Fourth Edition, 1996, pages 161–169.

The disk array of RAID level 3 or 5 has one or a plurality of disk groups called a parity group, and each parity group includes a plurality of data disk devices for storing data and one redundant disk device for storing parity data. For simplicity, it is assumed that the disk array has one parity group and the parity group includes (N−1) data disk devices and a single redundant disk device (i.e., a total of N).

Write data transferred to a disk array controller from a data processor is divided into a plurality of (N−1) of data in the disk array controller (in bit or byte units). Parity data for one parity group is formed from divided plurality of data. The disk array controller writes the (N−1) divided data into corresponding (N−1) data disk devices and the parity data into the redundant disk device in parallel. At this time, after successful access to the (N−1) disk devices in the data disk devices and the redundant disk device, the disk array controller reports to the data processor that the data write has completed.

On the other hand, when a data read request is transferred from the data processor to the disk array controller, if the disk array controller successfully accesses the corresponding addresses of the (N−1) disk devices, the requested data can be constructed (synthesized) from the data of the (N−1) disk devices. Therefore, the disk array controller can report to the data processor that the data read has completed and transfer the synthesized data to the data processor.

The technique in which the disk array controller reports to the data processor that the accesses have completed when the accesses to the disk array associated with the data write and data read operations described above are completed (successful) for the (N−1) disk devices, is disclosed, for example, in Japanese Patent Application No. Hei 7-200191. In addition, related techniques are also disclosed in Japanese Patent Applications No. Hei 8-123628 and No. Hei 8-171463.

As described above, when all the disks (N sets) constituting a parity group are operating normally, the disk array controller can respond to the data processor if data write/read operations are completed for the arbitrary (N−1) of the N disk devices.

When all the disk devices are operating normally, the data processing for data write/read operations, for example, will be completed within about 10 to 30 milliseconds when there is a small amount of data, e.g. 32 kilobytes, and about 20 to 40 milliseconds when there is a large amount of image data, e.g. 400 kilobytes. Therefore, even if there is a problem (the problem does not mean failure of disk device) in one disk device in N disk devices, when the data write operation is being performed, there is enough time for re-trying access to the disk device for correcting an error after the data processor is notified of the completion of the data write. On the other hand, when the data read operation is being performed, there is also enough time for retrying access to the disk device for correcting an error after the read data are transferred to the data processor.

Consequently, when all the disk devices comprising a parity group are operating normally, even if the monitoring time for the inability (failure) of data write/read operations is set for 10 seconds, because the data write/read operation for arbitrary (N−1) in N disk devices, as mentioned above, would usually be completed in a short time, neither notification of completion of a data write operation nor data transfer (in a case of a reading operation) to the data processor would be greatly delayed. That is, the data processor can transfer the subsequent data write/read request to the disk array controller immediately after it has received the notification for completion of data write operation or the data read out from the disk array controller.

However, when there is a reduced state in which one of the disk devices constituting a parity group can not be used because of a failure, data processing is not completed unless the data write/read operations for all of the (N−1) disk devices, except for a defective disk device, has been successful. In this situation, if one set in the (N−1) disk devices, except the defective disk device, has a problem and also the monitoring time for the inability (failure) of data write/read operations is set, for example, at 10 seconds of the same time as that of the normal condition of the parity group, the disk array controller, in a worst case, reports to the processor that the access has failed after re-trying access for error correction for 10 seconds. This creates a problem because the data processing speed of the entire computer system decreases.

SUMMARY OF THE INVENTION

An object of the present invention is to provide a control device and control method for a disk array which changes the operation monitoring time of a data write or read of a disk array based on the state of the disk array.

Another object of the present invention is to provide a control device and control method for a disk array which sets the access re-trying time for error correction as short as possible when one of the disk devices constituting a parity group can not be used because of a failure, and reports to the processor its result as fast as possible when the access re-trying for error correction does not complete within the re-trying time.

According to one aspect of the present invention, a control device for a disk array is provided which comprises: a first element which accesses a plurality of disks of the disk array; a timer which counts to a first timeout value when all of the disks are normal and to a second timeout value when one of the disks is defective, unless the first element receives a response from the disks; and a second element which determines that an access fails if the timer reaches one of the first or second timeout values.

According to another aspect of the present invention, a control device for a disk array is provided which comprises:

a first element which monitors an operation of the disk array for a predetermined time; and a second element which changes the predetermined time based on a state of the disk array.

According to another aspect of the present invention, a control method for a disk array is provided which comprises: accessing a plurality of disks of the disk array; counting to a first timeout value when all of the disks are normal and to a second timeout value when one of the disks is defective, unless there is a response during the accessing step; and determining that an access fails if one of the first or second timeout values is reached during the counting step.

BRIEF DESCRIPTION OF THE DRAWINGS

Other features and advantages of the invention will be made more apparent by the following detailed description and the accompanying drawings, wherein.

In the drawings, the same reference numerals represent the same structural elements.

DETAILED DESCRIPTION OF THE PREFERRED EMBODIMENTS

A first embodiment of the present invention will be described in detail below.

The present invention is applied to a disk array of RAID level 3 or 5. In this embodiment, for simplicity, a description related to RAID level 3 is provided.

Figure 1:
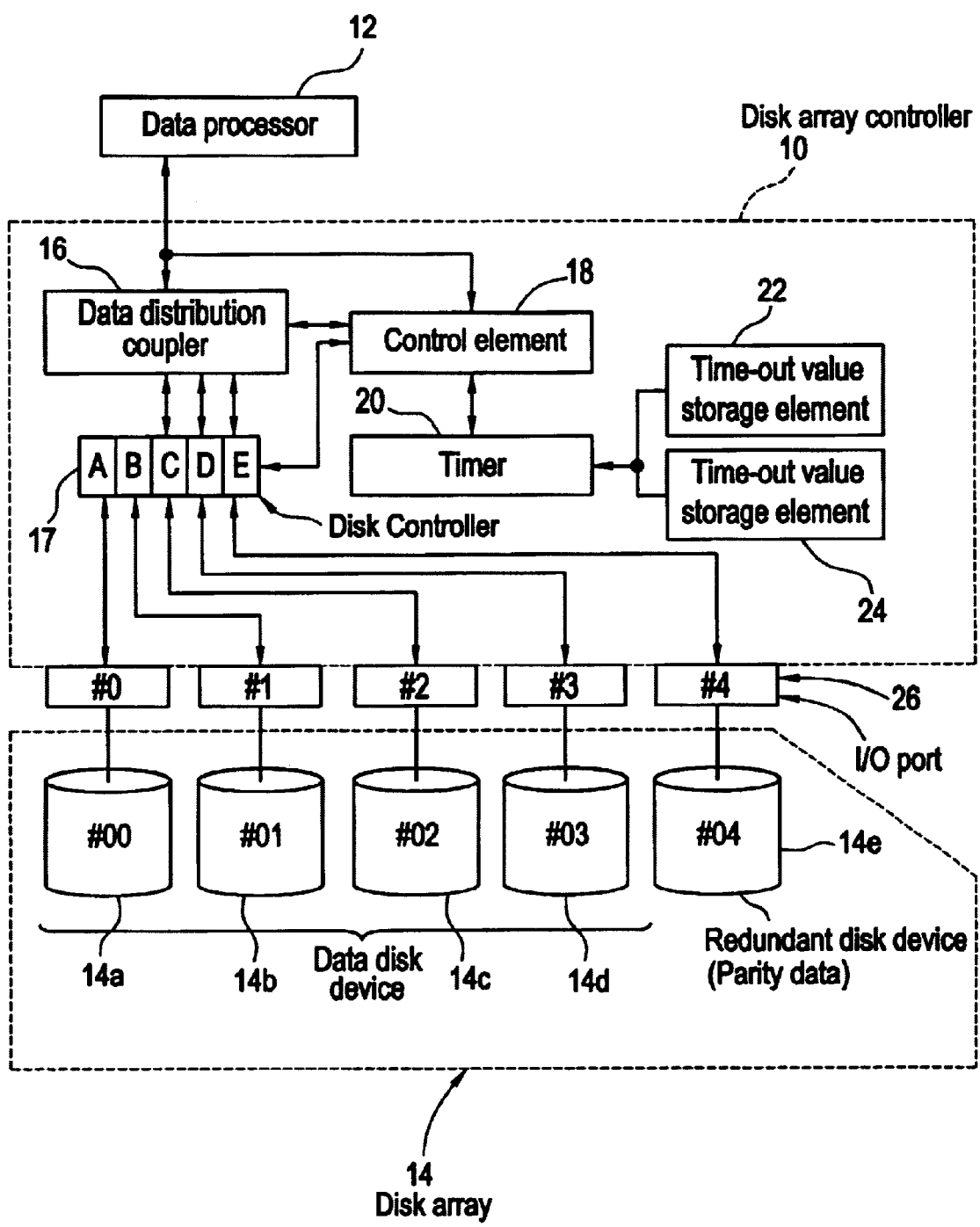
FIG. 1 is a block diagram of the present invention.

Referring to FIG. 1, a disk array controller 10 is provided between a data processor (such as a host computer) 12 and a disk array 14. A disk array device is composed of disk array controller 10 and disk array 14.

In the present embodiment, disk array 14 has four data disk devices (disk units) 14a to 14d and a redundant disk device 14e (i.e., configuration of RAID level 3), and numerals #00–#04 are given to these disk devices to identify each disk device. Note that the number of the data disk devices is not limited to four.

Disk array controller 10 includes a data distribution coupler 16, disk controller 17, a control element 18, a timer 20, and timeout value storage elements 22 and 24. Control element 18 controls the entire disk array controller 10. In the present embodiment, disk array controller 10 accesses disk devices #00–#04 through five I/O ports 26 with identification numbers of #0–#4 (actually, through disk controller 17). Disk controller 17 has five disk controllers A to E which control five disk devices 14a–14e, respectively. Timeout value storage element 22 is a memory which stores a timeout value used when the disk array device 14 is in normal state. Timeout value storage element 24 is a memory which stores a timeout value used when the disk array device 14 is in reduced state. The reduced state of the disk array device 14 is referred to the state in which one disk device in disk devices 14a–14e is defective and cannot be used. In this embodiment, the timeout values used in the normal and reduced states are 10 seconds and 1 second, respectively. However, it should be understood that these values are only illustrative and are not limited to these values.

Timer 20 counts to a timeout value in a normal state when the disk array is operating normally or to a timeout value in a reduced state, which is smaller than the timeout value in a normal state, when the disk array is in a reduced state, in which one disk device in the disk array is defective. If timer 20 count reaches the timeout value in normal state or the timeout value in a reduced state, disk array controller 10 reports to data processor 12 that an access to the disk array failed. Thus, when the disk array is in the normal state, because there is a sufficient time for re-trying access to the disk devices, the failure rate of the disk devices can be reduced by re-trying access to the disk devices efficiently. On the other hand, when the disk array is in the reduced state, because timer 20 is set to count to the timeout value in a reduced state, the time spent retrying the access can be reduced. Thus, the processing efficiency of the whole computer system can be improved.

The timeout values in the normal and reduced states may be stored in one memory without independently providing timeout value storage element 22 for a normal state and timeout value storage element 24 for a reduced state. Alternatively, for example, by detecting the normal or reduced state of the disk array device 14 in control element 18, the data representing different timeout values may be generated to and supplied to timer 20. In short, it is necessary for timer 20 to count the two different timeout values selectively based on the normal or reduced state of disk array 14.

Next, the operation of this embodiment will be described.

For purposes of simplicity, the operation steps concerning data processing in the data distribution coupler 16 are omitted.

Figure 2:
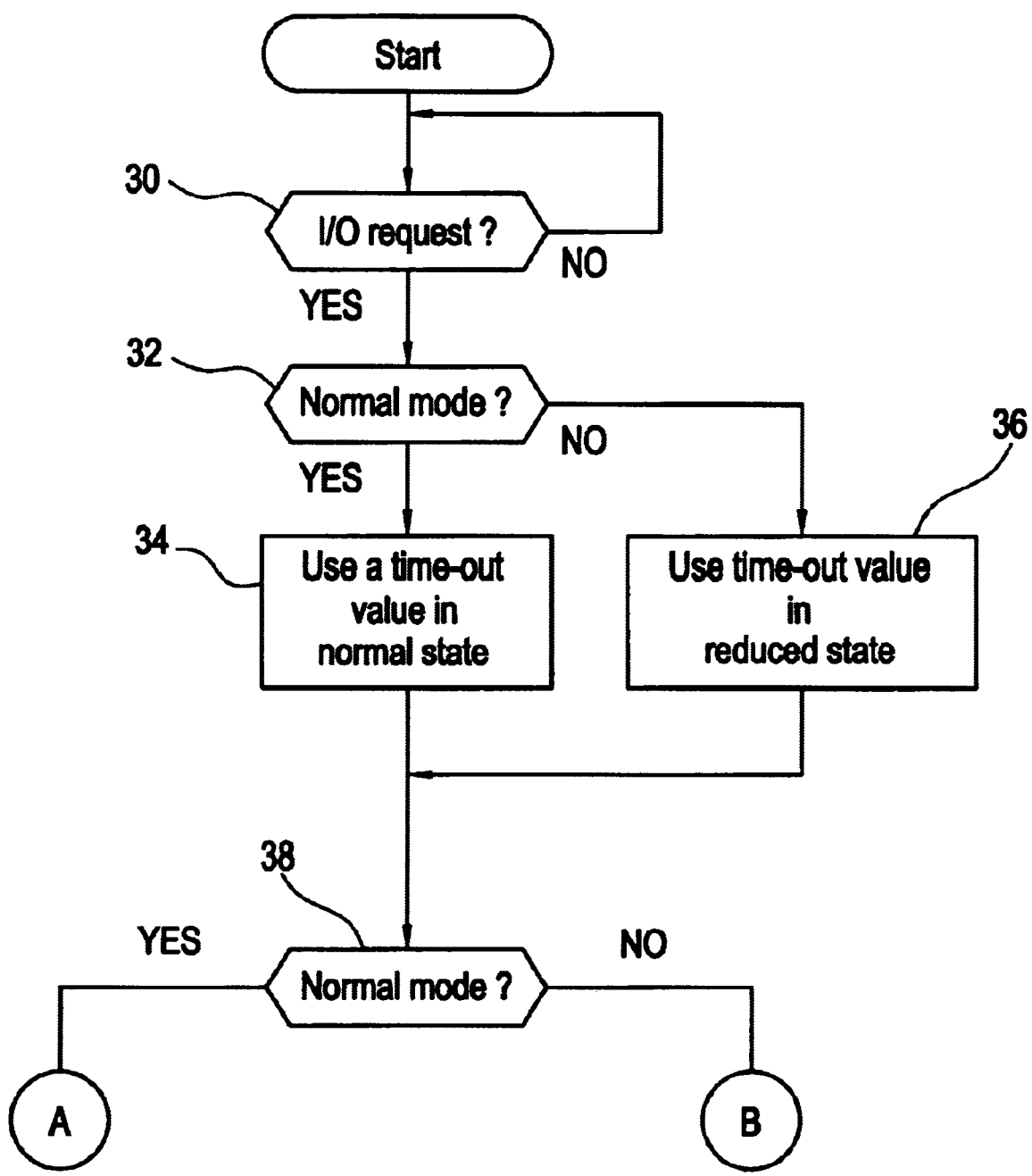
FIG. 2 is a flow chart illustrating the first embodiment of the present invention.

Referring to FIG. 2, in step 30, disk array controller 10 determines whether it has received an I/O (data write/read) request from data processor 12. When disk array controller 10 receives an I/O (data write/read) request from data processor 12, control element 18 accesses disk controller 17 to determine whether disk array 14 is operating in the normal mode (i.e., the operation is in normal state) or in the reduced mode (i.e., one of disk devices 14a through 14e is defective) (step 32).

When control element 18 in disk array controller 10 determines that the operation of disk array 14 is in the normal mode, control element 18 sets and supplies the timeout value of the normal state stored in storage element 22 to timer 20 (step 34).

On the other hand, when control element 18 determines that the operation of disk array 14 is in the reduced mode, control element 18 sets and supplies the timeout value of the reduced state stored in storage element 24 to timer 20 (step 36).

In step 38, control element 18 determines again whether or not disk array 14 is in the normal mode.

When control element 18 determines that disk array 14 is in the normal mode, the process goes to a routine A.

Figure 3:
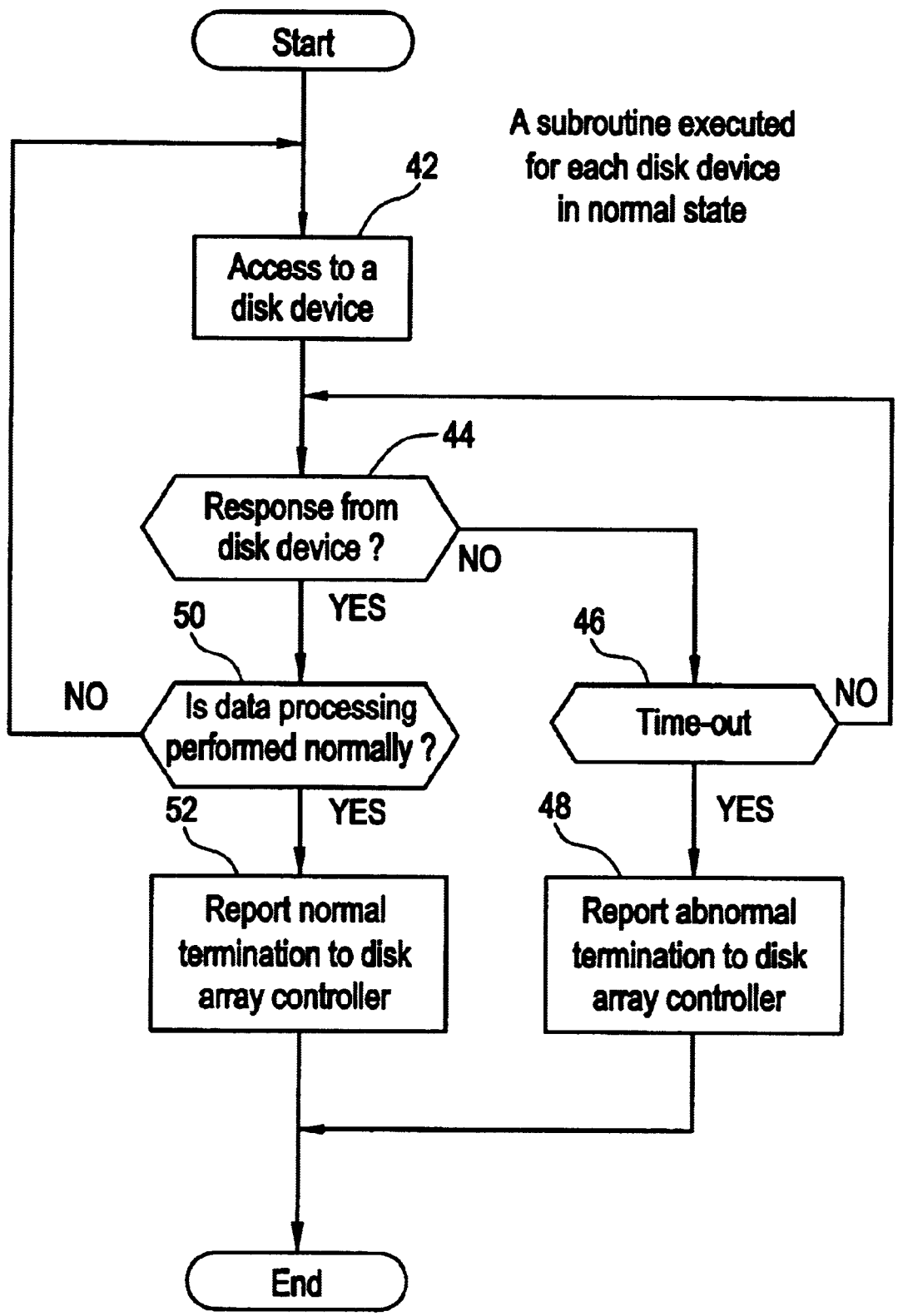
FIG. 3 is a flow chart illustrating the first embodiment of the present invention.
Figure 4:
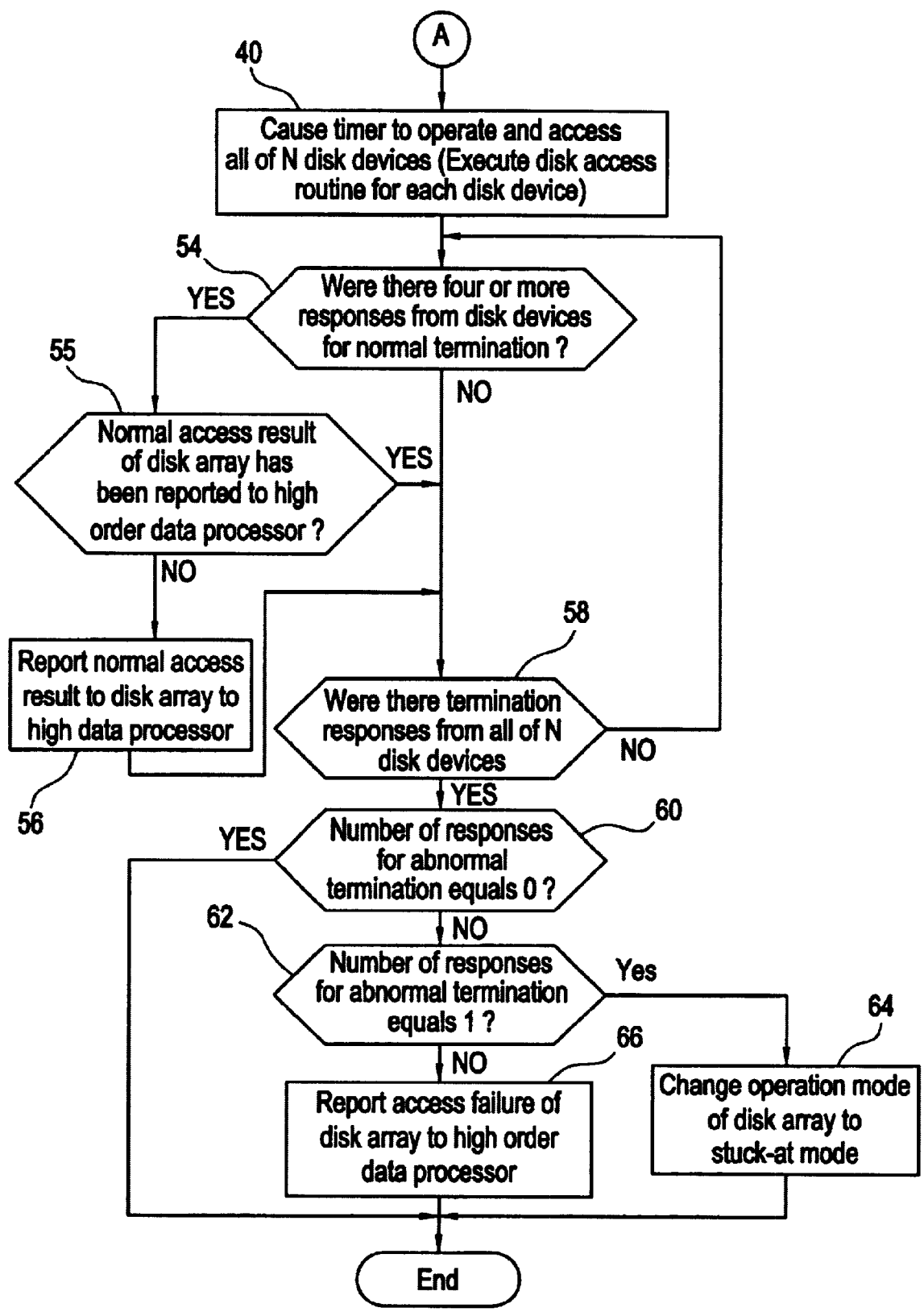
FIG. 4 is a flow chart illustrating the first embodiment of the present invention.

Referring to FIG. 4, in step 40, control element 18 makes timer 20 count and each of the all N disk devices (in the embodiment of FIG. 1, all of five disk devices) performs a disk access subroutine shown in FIG. 3.

Next, the disk access subroutine will be described below.

In FIG. 3, the disk access subroutine is executed for each of the disk devices which is operating normally. More specifically, the disk access subroutine is independently executed for each of the N disk devices when disk array 14 is in the normal mode. On the other hand, the disk access subroutine is independently executed for each of the N−1 disk devices when disk array 14 is in the reduced mode as will be explained below.

In step 42, disk controller 17 accesses the disk devices. Disk controller 17 determines whether or not there are responses from the accessed disk device (step 44), which show a result of the data processing. If there are no responses from the disk device, in step 46, control element 18 determines whether timer 20 is counting toward the timeout value of the normal state or whether it has reached the timeout value. If it has not reached the timeout value, the process returns to step 44. In other words, after disk controller 17 has accessed the disk device in step 42, control element 18 always continues to determine if a timeout occurs until the disk devices generate any responses in step 44.

If control element 18 determines that timer 20 has reached the timeout value of the normal state in step 46, it reports an abnormal termination in step 48. This means that there has been a failure in data processing in the disk devices to disk array controller 10 (in practice, disk controller 17) in step 48 to finish the subroutine.

In step 44, if control element 18 determines that disk controller 17 has received any response which denotes any result in data processing from the disk device, the process will progress to step 50. In step 50, control element 18 determines whether or not data processing has been performed normally. If control element 18 determines that data processing has been performed normally, it reports the normal termination of data processing to disk array controller 10 (in practice, disk controller 17) in step 52. The report of normal termination in step 52 means a report of a normal data write when a data write operation is being performed and a report of a normal data read and transfer of the read data when a data read operation is being performed.

In step 50, if control element 18 determines that data processing has not been performed normally, the process will return to step 42 and control element 18 makes disk controller 17 access the disk device again. In this embodiment, a timeout determination step such as step 46 may be provided in a loop from step 50 to step 42.

Referring again to FIG. 4, the disk access subroutine is executed for each disk device independently as described above. In step 54, disk controller 17 determines whether there are (N−1) or more responses for normal termination from disk array 14. If the determination in step 54 is "Yes", the process proceeds to step 55 and control element 18 determines whether or not the normal access result of the disk array has been reported to data processor 12. When the determination in step 55 is "No", the process will proceed to step 56 and control element 18 reports the normal access result of disk array 14 to data processor 12. After control element 18 reports the normal access result of disk array 14 to data processor 12 the process will advance to step 58.

In step 58, control element 18 determines whether or not there are termination responses from all of the N disk devices. The termination response means both the report of normal termination and the report of abnormal termination in steps 48 and 52 in the disk access subroutine. If the determination in step 58 is "No", the process returns to step 54 and control element 18 performs the above described checking. Both of the determinations in steps 54 and 55 are "Yes" at this time, so that the process turns around the loop of steps 54, 55 and 58 until control element 18 confirms that there are termination responses from all of the N disk devices in step 58. If the determination in step 58 is "Yes", control element 18 determines whether or not the number of responses for abnormal termination is zero (step 60). If the number of responses for abnormal termination is zero, it means that all of the N disk devices have responded normally, and the process ends.

In step 60, if control element 18 determines that the number of responses for abnormal termination is not zero, then it determines whether or not the number of responses for abnormal termination equals one in step 62. If the number of responses for abnormal termination equals one, the operation mode of the disk array is changed to the reduced mode (step 64) and the process ends.

On the other hand, in step 62, if the number of responses for abnormal termination is not determined to be one (that is, two or more), control element 18 reports to data processor 12 that the access to disk array 14 fails (step 66). The processing after this step is unrelated to the present invention, however, it is necessary to exchange the defective disk device.

Next, the operation when disk array 14 is not determined to be in the normal mode will be described below.

Referring to FIG. 2, in step 38, if disk array 14 is determined to be in the reduced mode, the process will go to routine B.

Figure 5:
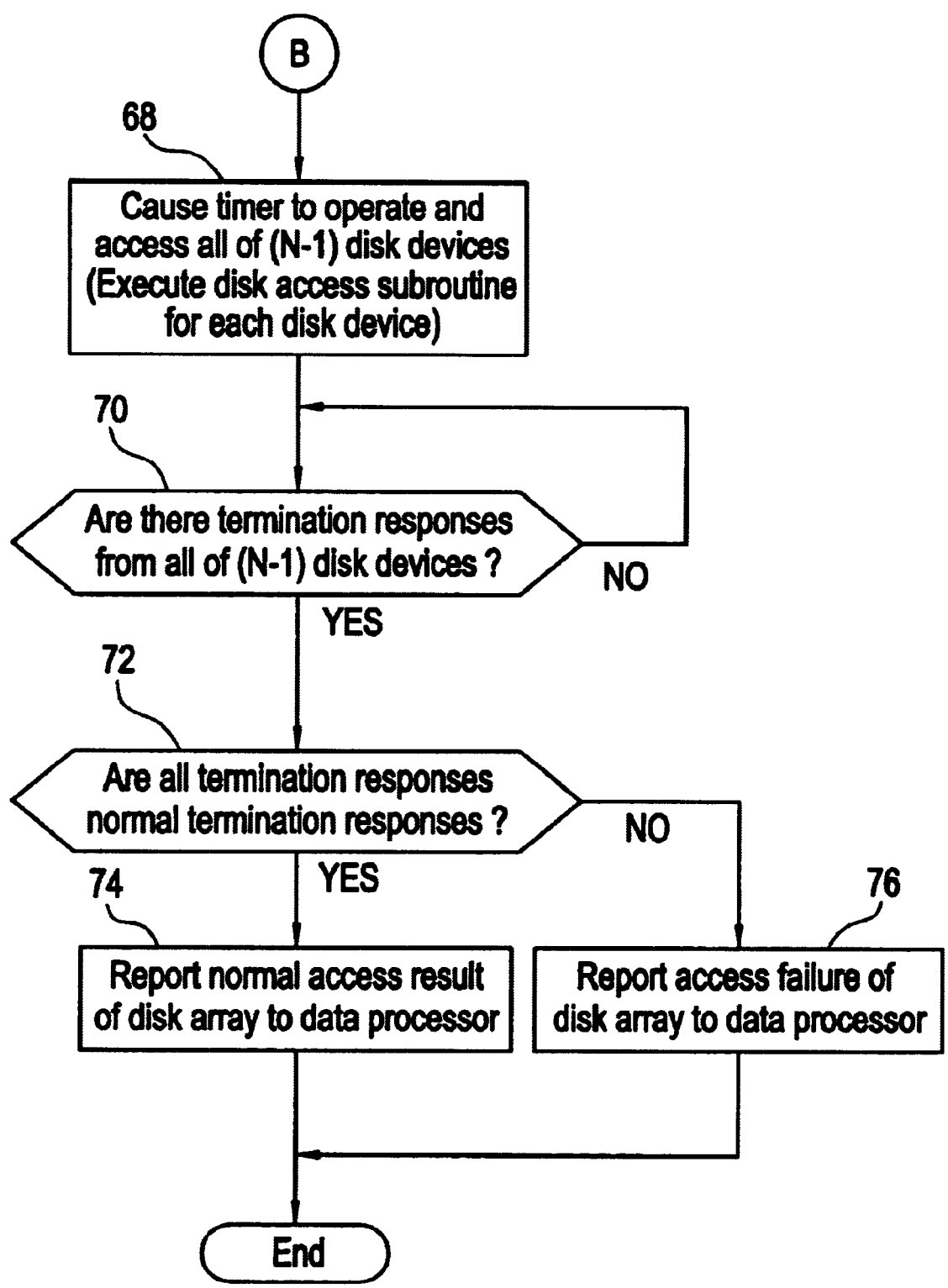
FIG. 5 is a flow chart illustrating the first embodiment of the present invention.

Referring to FIG. 5, in step 68, control element 18 makes timer 20 operate and also executes the disk access subroutine for each of the (N−1) disk devices (as for the embodiment in FIG. 1, all of the four disk devices which are not defective). The disk access subroutine processes are described above, therefore, any further explanation will be omitted.

In step 70, control element 18 determines whether or not there are termination responses from all of the (N−1) disk devices of disk array 14. If the determination in step 70 is "No", it waits for the termination responses from all of the (N−1) disk devices. When the determination in step 70 turns to "Yes", control element 18 determines whether or not all of the termination responses are normal (step 72). In step 72, if the determination result is "Yes", the process proceeds to step 74 and control element 18 reports the normal access result of disk array 14 to data processor 12. As described above, when there are normal termination responses from (N−1) disk devices in the reduced mode, the data write/read operations can be terminated.

On the other hand, if the determination in step 72 is "No", control element 18 reports to data processor 12 that the access to disk array 14 fails. The processing after this step is unrelated to the present invention, however, it is necessary to exchange the defective disk device.

Next, a second embodiment of the present invention will be described below.

Figure 6:
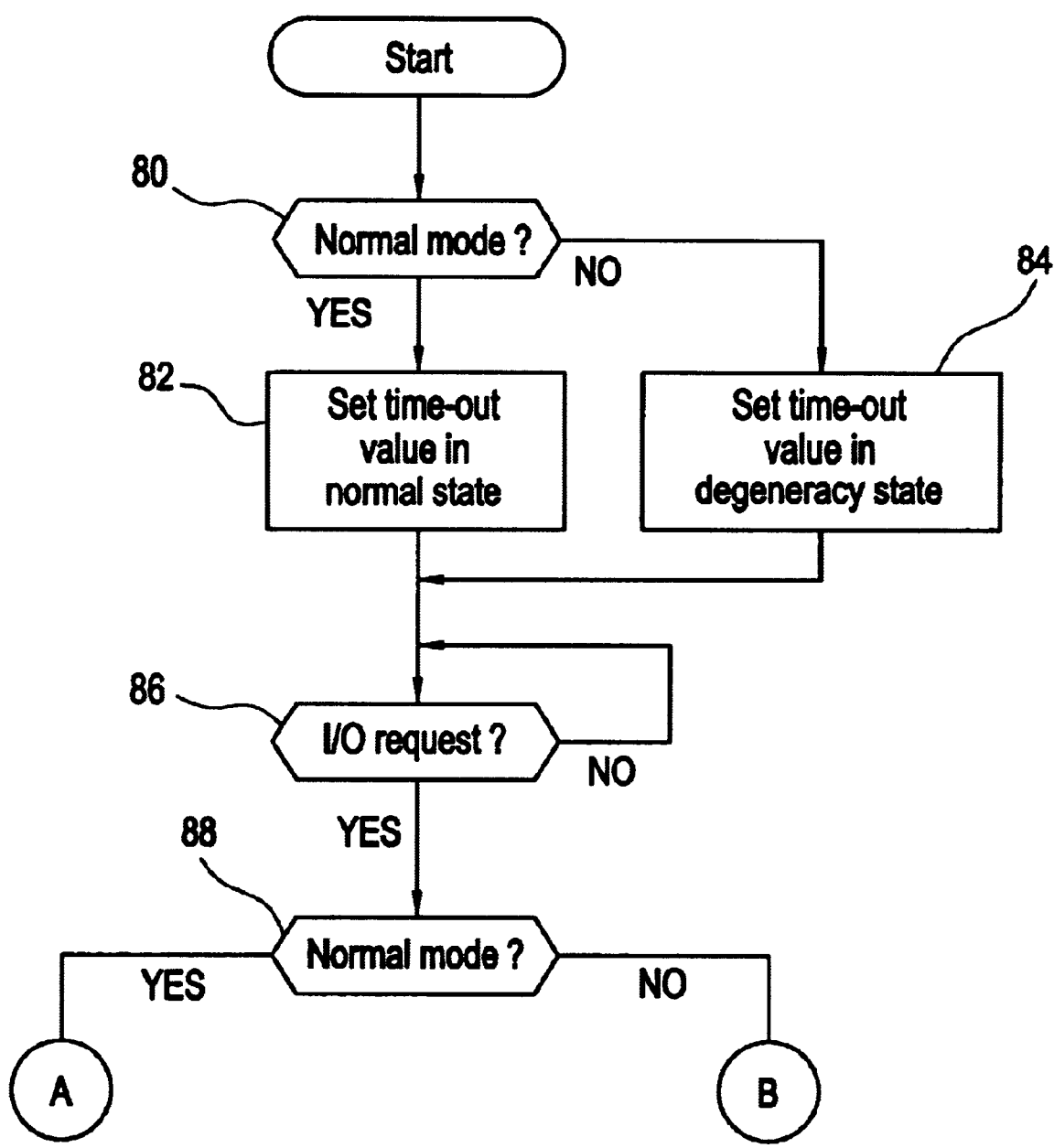
FIG. 6 is a flow chart illustrating the second embodiment of the present invention.

Referring to FIG. 6, in the second embodiment, before an I/O request is issued from data processor 12, disk array controller 10 detects whether disk array 14 is in the normal mode (state) or reduced mode (state) (step 80) and sets and supplies the timeout value of the normal state or reduced state to timer 20 (steps 82 and 84). Disk array controller 10 determines whether or not the I/O request has been issued from data processor 12 (step 86). If disk array controller recognizes the I/O request, it determines whether or not disk array 14 is in the normal mode, in the same manner as that of in FIG. 2 (step 88). The operation after this step is the same as that of the first embodiment, therefore, further explanation will be omitted.

While this invention has been described in conjunction with the preferred embodiments described above, it will now be possible for those skilled in the art to put this invention into practice in various other manners.

What is claimed is:

1. A control device for a disk array comprising:
    a first element which accesses a plurality of disks of said disk array;
    a timer which counts to a first timeout value when all of said disks are normal and to a second timeout value when one of said disks is reduced, unless said first element receives a response from said disks; and
    a second element which determines that an access fails if said timer reaches one of said first or second timeout values.

2. The control device for a disk array as claimed in claim 1, further comprising:
    a first storing element which stores said first timeout value; and
    a second storing element which stores said second timeout value.

3. The control device for a disk array as claimed in claim 1, further comprising:
    a third element which detects whether all of said disks are normal or one of said disks is reduced; and
    wherein said timer is set to one of said first or second timeout values based on detection by said third element.

4. The control device for a disk array as claimed in claim 3, wherein said third element detects whether all of said disks are normal or one of said disks is reduced and said timer is set to one of said first or second timeout values based on detection by said third element whenever an access to said disk array is designated.

5. The control device for a disk array as claimed in claim 3, wherein said third element detects whether all of said disks are normal or one of said disks is reduced and said timer is set to one of said first or second timeout values based on detection by said third element before an access to said disk array is designated.

6. The control device for a disk array as claimed in claim 1, wherein said second timeout value is smaller than said first timeout value.

7. A control device for a disk array comprising:
    a first element which monitors an operation of said disk array for a predetermined time; and
    a second element which sets said predetermined time to a first timeout value when data are read from or written to every disk of a parity group of said disk array and a second timeout value when data are read from or written to every disk except a defective disk of a parity group of said disk array.

8. The control device for a disk array as claimed in claim 7, wherein said second timeout value is smaller than said first timeout value.

9. The control device for a disk array as claimed in claim 7, further comprising:
    a first storing element which stores said first timeout value; and
    a second storing element which stores said second timeout value.

10. The control device for a disk array as claimed in claim 7, further comprising:
    a third element which detects said disk array is normal or said disk array has a defective disk;
    wherein said second element changes said predetermined time based on detection by said third element.

11. The control device for a disk array as claimed in claim 10, wherein said third element detects said disk array is normal or said disk array has a defective disk and said second element changes said predetermined time based on detection by said third element whenever an access to said disk array is designated.

12. The control device for a disk array as claimed in claim 10, wherein said third element detects said disk array is normal or said disk array has a defective disk and said second element changes said predetermined time based on detection by said third element before an access to said disk array is designated.

13. A control method for a disk array comprising:
    accessing a plurality of disks of said disk array;
    counting to a first timeout value when every disk of a parity group of said disk array are read from or written to and to a second timeout value, which is a different value from said first timeout value, when every disk except a defective disk of a parity group of said disk array are read from are written to, unless there is a response during said accessing step; and
    determining that an access fails if one of said first or second timeout values is reached during said counting step.

14. The control device for a disk array as claimed in claim 13, further comprising:
    detecting whether all of said disks are normal or one of said disks is reduced; and
    setting one of said first or second timeout values based on detection detected during said detecting step.

15. The control device for a disk array as claimed in claim 14, wherein whether all of said disks are normal or one of said disks is reduced is detected during said detecting step and one of said first or second timeout values is set during said setting step whenever an access to said disk array is designated.

16. The control device for a disk array as claimed in claim 14, wherein whether all of said disks are normal or one of said disks is reduced is detected during said detecting step and one of said first or second timeout values is set during said setting step before an access to said disk array is designated.

17. The control device for a disk array as claimed in claim 13, wherein said second timeout value is smaller than said first timeout value.

* * * * *